June 13, 1944. M. FREUND Re. 22,495

SPRING UNIT FOR SPRING CUSHIONS

Original Filed June 4, 1936 2 Sheets-Sheet 1

Inventor

MORRIS FREUND

By Gustav. A. Wolff.

Attorney

June 13, 1944. M. FREUND Re. 22,495

SPRING UNIT FOR SPRING CUSHIONS

Original Filed June 4, 1936 2 Sheets-Sheet 2

Inventor

MORRIS FREUND

By Ignatius Q. Wolff.

Attorney

Reissued June 13, 1944

Re. 22,495

UNITED STATES PATENT OFFICE 22,495

SPRING UNIT FOR SPRING CUSHIONS

Morris Freund, Cleveland, Ohio, assignor, by mesne assignments, to John C. Lincoln, Scottsdale, Ariz.

Original No. 2,201,997, dated May 28, 1940, Serial No. 83,547, June 4, 1936. Renewed July 12, 1939. Application for reissue March 17, 1941, Serial No. 383,889

17 Claims. (Cl. 155—179)

This invention relates in general to soft spring cushions for davenports, arm-chairs, etc., and more particularly to spring units for such cushions. At present spring units for soft spring cushions consist of a plurality of rows of soft coiled springs arranged side by side. In these rows each of the springs is individually pocketed, to prohibit contact of coils of different springs with each other and individually sewed to the top and bottom portion of its respective pocket. The springs of such a unit act individually, no-co-operation of the springs with each other being present and therefore a thus built soft spring unit can easily be fully compressed by heavier loads. To overcome this deficiency the spring unit must be heavily padded so as to retain its desired softness when fully compressed. However, a heavy padding of the spring units is expensive in material and labor, makes the finished cushion heavy and stiff and causes the cushion to lose its softness as padding material particularly when continuously under compression easily packs.

The general object of the present invention is to overcome the above described deficiencies in soft spring cushions by the provision of a spring unit embodying a plurality of elongated co-operating flat spring-structures arranged side by side, connected with each other and individually pocketed with respect to each other in order to avoid contact of the flat spring-structure with each other.

Another object of the present invention is the provision of a spring unit embodying a plurality of individually pocketed, elongated, co-operating flat spring-structures arranged side by side, each of the spring-structures embodying yielding top- and bottom-portions yieldingly connected with each other at the ends of said portions.

A further object of the present invention is the provision of a spring unit embodying a plurality of individually pocketed, elongated, flat spring-structures arranged side by side, each of the spring-structures embodying yielding top- and bottom-portions yieldingly connected with each other at the ends of said portions and all the spring-structures being interconnected with each other at their top- and bottom-portions so as to form a single spring unit.

In addition the invention has certain other marked superiorities, which radically distinguish it from presently known structures. These improvements or superior characteristics embodying certain novel features of construction are clearly set forth in the appended claims and a preferred form of embodiment of the invention is hereinafter shown with reference to the accompanying drawings forming part of the specification.

Figure 1:
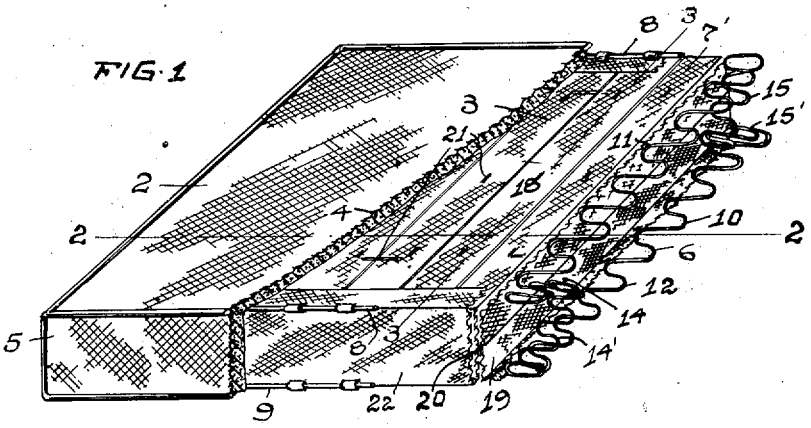
Figure 1 is a perspective view of a soft spring cushion partly broken away to disclose the spring unit of the cushion, which unit is built in accordance with the invention.
Figure 2:
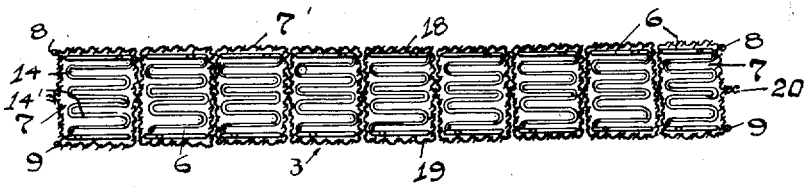
Figure 2 is a cross-sectional view through the spring unit shown in Fig. 1, the section being taken on line 2—2 of Fig. 1.
Figure 3:
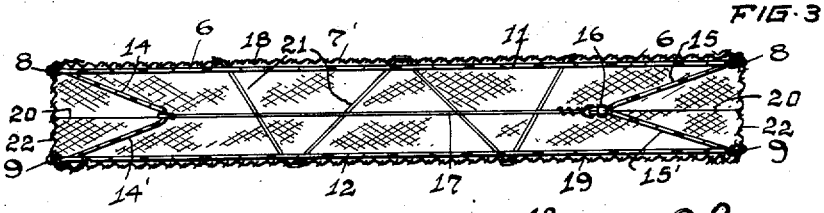
Figure 3 is a longitudinal sectional view through one of the pockets of the spring unit shown in Fig. 1, disclosing the elongated flat spring structure according to the invention, the section being taken on line 3—3 of Fig. 1.
Figure 4:
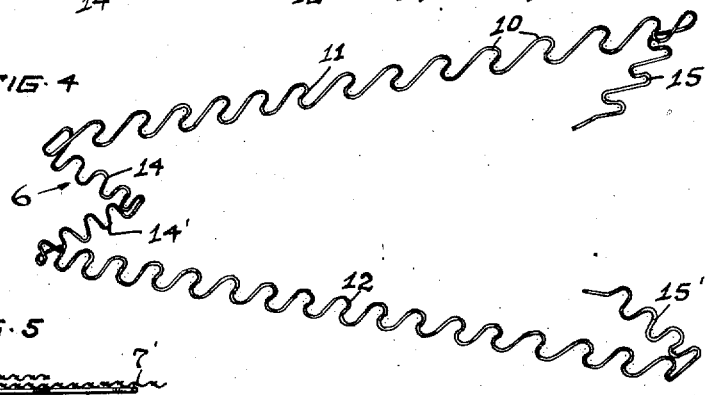
Figure 4 is a perspective view of the elongated flat spring-structure before its assembly and pocketing and Figure 5 is an enlarged fragmentary sectional view showing the attachment of one of the ends of a flat spring-structure to an edge-wire, interconnecting all the tops of the flat spring-structures of a spring unit.

Referring more particularly to the drawings, reference numeral 2 represents a soft spring cushion embodying a soft spring unit 3, padded with padding material 4 and enclosed in a covering 5. The spring unit 3 consists of a plurality of elongated flat spring-structures 6, pocketed in elongated pockets 7 of a burlap covering 7' and interconnected with each other by means of edge-wires 8 and 9 as will be later described. Each of the elongated flat spring-structures 6, preferably made of relatively thin steel wire bent to sinuous shape, so that the loops 10 of the structure extend substantially parallel to each other, embodies two parallelly arranged seating- and base-portions 11 and 12 respectively, adapted to be longitudinally extended and/or compressed.

These portions, the upper one 11 being the seating portion and the lower one 12 being the base or supporting portion, are interconnected with each other by means of oppositely inclined levers 14, 14' and 15, 15', integrally extended from or rigidly connected to the front and rear ends of the portions 11 and 12. Levers 14, 14', which, as shown, integrally connect the front ends of the portions 11 and 12, extend rearwardly at an inclination and are angularly related to each other, and levers 15, 15' extend forwardly at an inclination and angularly to each other and are rigidly connected with each other by means of a clamp 16. When the spring structure is assembled, the angle between the levers 14, 14' and the angle between levers 15, 15' are smaller than before assembly of the structure in order to effect upward bulging of the upper and the base portions of the spring structure, and such bulging of said portions is increased by means of a tension wire 17, connecting the meeting point of the levers 14, 14' with the meeting point of the levers 15, 15'.

The spring structures 6, when enclosed in the elongated pockets 7 of the burlap coverings 7', which pockets are preferably formed by sewing superposed burlap pieces 18 and 19 on parallel seams 20, are of a rectangular, elongated shape, as the walls of the pockets straighten out bulging of the top- and bottom-portions 11 and 12. The arrangement is sufficient to give the spring-structure the desired shape and form, however, I prefer in addition to tie the top- and base-portions 11 and 12 of the spring-structures by means of twine 21, preferably drawn through the top and bottom faces of the pockets 7 so as to simultaneously secure the top- and base-portions of the spring-structures to each other and to the pockets 7 of the covering 7'.

Figure 5:
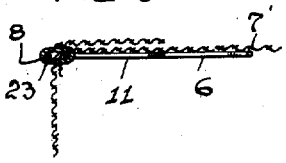

The open ends of the pockets 7 are covered by end pieces 22 of burlap secured to the pockets by clamps 23, see Fig. 5, interconnecting the ends of top- and base-portions 11 and 12 of the spring-structure 6 with edge wires 8 and 9 respectively. The edge wires 8 and 9 connect the pocketed spring structures to a soft spring unit which can readily be used as base for a soft spring cushion.

The described soft spring unit embodies a plurality of elongated, co-operating, joint spring structures, each of which embodies a relatively soft yielding surface with inherent load resistance. This load resistance of the seating surface, which is proportionate to the tension of the wire 17 and which is effected by the stresses tending to bulge the top and bottom portions 11 and 12 outwardly, increases with the load as the lever arms 14, 14' and 15, 15' approach each other under load and thus increase the bulging stresses.

Figure 6:
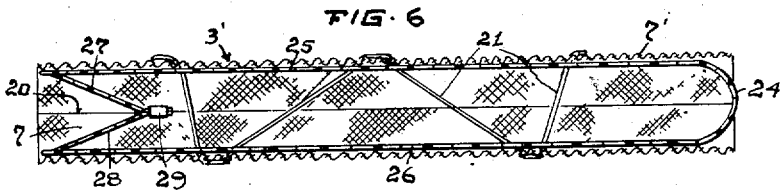
Figure 6 is a longitudinal sectional view through one of the pockets of a somewhat modified form of a spring unit for a soft spring cushion and Figure 7 is a perspective view of the modified flat spring-structure used in the spring unit shown in Fig. 6.
Figure 7:
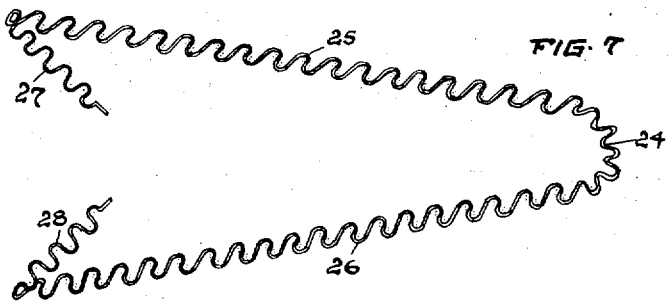

The interconnection of the spring structures 6 by the edge wires 8 and 9 effects co-operation of adjoining spring structures and insures support of a load by a plurality of spring structures. In the modified form of a spring unit 3' (shown in Figs. 6 and 7) the spring structures each embody a sinuous-shaped wire doubled back on a curve as at 24 to form top and base portions 25 and 26. The front ends of these portions are bent downwardly and rearwardly to form integral levers 27, 28, connected to each other by means of a clamp 29. This type of spring unit, which otherwise is similarly constructed to the type described in Figs. 1 through 5, is particularly adapted for cushions of chairs having the rear end of the soft spring cushion (the curved end) partly extended under the back of the seat.

Figure 8:
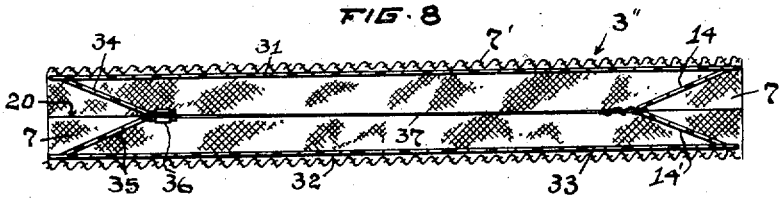
Figure 8 is a longitudinal sectional view through one of the pockets of another modified form of a spring unit for a soft spring cushion and Figure 9 is a perspective view of the modified flat spring-structure used in the spring unit shown in Fig. 8.
Figure 9:
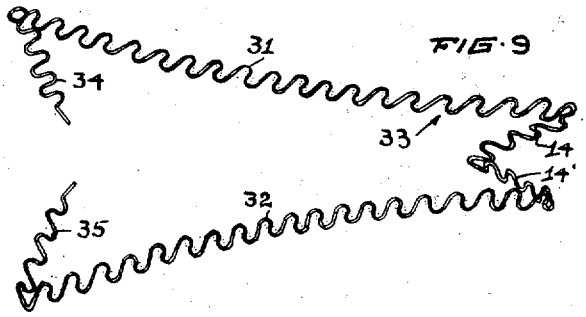

In the modified form of a spring unit 3'' such as shown in Figs. 8 and 9, the top and base portions 31 and 32 of the spring structure 33 are curved to insure an absolute straight seating and base surface of the finished spring unit 3'' when the levers 34 and 35 are rigidly secured to each other by means of a clamp 36 and forcibly drawn toward each other by a tension-wire 37. This construction of the spring unit avoids the necessity of connecting the top and base portions 31 and 32 by twine, facilitates slipping of the assembled spring structure 33 into the pockets 7 of the burlap covering 7' and in addition produces a more pliable and softer surface of the assembled spring unit 3''.

Having thus described my invention, what I claim is:

1. A wire spring structure for soft spring cushion units comprising horizontally corrugated straight portions arranged in spaced relation parallel to and above each other, and similarly, corrugated V-shaped spacing means with a sharp-edged apex, said means being integral with and extending inwardly from the opposite ends of said portions and connecting same yieldingly and vertically shiftably with each other.

2. A wire spring structure for soft spring cushion units comprising horizontally corrugated straight portions arranged parallel to each other in spaced relation above each other, integral, substantially V-shaped, corrugated means connecting said straight portions and spacing same from each other, means connecting the center portions of said V-shaped means with each other and an elongated sleeve-like covering enclosing said spring structure.

3. A wire spring structure for soft spring cushion units comprising a horizontally corrugated, substantially straight, elongated seating portion, a similar, horizontally corrugated, substantially straight base portion arranged below said seating portion in spaced relation thereto, corrugated, inclined integral lever arms inwardly extending from the opposite ends of said seating portion and said base portion, said lever arms intersecting each other and being rigidly connected to each other at the points of intersection, and connecting means for connecting the points of intersection of said levers and preventing said points from moving away from each other.

4. A wire spring structure as described in claim 3, wherein the spring structure is inserted in compressed condition into a sleeve-like covering of smaller height, and wherein the central areas of the seating and base portions are held in substantially parallel relationship by means connecting said areas to each other and to said covering.

5. A wire spring structure for soft spring cushion units comprising horizontally corrugated straight portions arranged in spaced relation parallel to and above each other, similarly corrugated spacing means integral with and extending inwardly from the opposite ends of said portions and connecting same yieldingly and vertically shiftably with each other, and an elongated, sleeve-like covering enclosing said spring structure.

6. A wire spring unit for use in cushions and the like comprising a continuously horizontally corrugated wire rebent by twisting the wire in local areas between adjoining corrugations to provide an accordion fold portion with a sharp-edged apex at one end of a substantially flat seating area, the normal divergence of the elements of such folded portion being different from their divergence when such spring unit is assembled in a cushion.

7. A wire spring unit for use in cushions and the like comprising a horizontally zig-zag looped continuous wire having straight wire-portions between said loops related at substantially right angles to the longitudinal axis of said spring unit, and a support formed by twisting some of said straight wire-portions arranged in definite areas of said wire to provide a seating area and an accordion-like, V-shaped support with a sharp-edged apex, said support being extended from one end of said seating area.

8. A wire spring unit for use in cushions and the like comprising a continuous corrugated wire rebent by twisting in local areas between adjoining corrugations to provide an accordion fold portion with a sharp-edged apex at one end of a substantially flat seating portion, said wire corrugated in such fashion that in the areas therein between said accordion fold portions, the major portion of the flexure of said wire during any substantial change in the divergence of said accordion fold portions occurs as torsion in elements extending substantially normal to the plane which includes said seating portion and said accordion fold portions.

9. A wire spring unit for use in cushions and the like comprising a sinuous continuous wire provided with alternate straight and curved portions and rebent by twisting in some of the straight portions to provide an accordion fold portion with a sharp-edged apex at one end of a substantially flat seating portion, said rebends formed so that the major portion of the flexure of the wire during any substantial change in the divergence of said accordion fold portions occurs as torsion in said straight portion.

10. A wire spring unit for use in cushions and the like comprising a corrugated wire sharply rebent by twisting in local areas to provide an accordion fold portion with a sharp-edged apex at one end of a substantially flat seating portion, said wire being corrugated and formed with sharp angle bends in its accordion fold to effect proper folding of same when loaded.

11. In a wire spring unit for use in cushions and the like, a corrugated, substantially straight seating and resting portion, and V-shaped corrugated supporting means having substantially straight portions between right-handed and left-handed loops forming the corrugations of said supporting means, said V-shaped supporting means including a straight portion sharply twisted to form said supporting means with a sharp-edged apex.

12. In wire units for use in cushions and the like, horizontally corrugated seating means, and V-shaped corrugated means supporting said seating means, said V-shaped supporting means having a sharp-edged apex formed by twisting said supporting means between two loops of its corrugations to permit of maximum folding action of said supporting means under excessive loads carried by said seating means.

13. A wire spring unit for use in cushions and the like, comprising a horizontally corrugated seating means, and V-shaped corrugated supporting means for said seating means, said V-shaped supporting means including a sharp-edged apex formed by twisting the wire between two adjoining corrugations to effect accordion-like folding of said supporting means under excessive loads carried by said seating means.

14. In a wire spring structure a corrugated wire bent to form a horizontally corrugated, substantially straight supporting portion, and similarly corrugated V-shaped means integrally extending from one end of said supporting portion, said V-shaped means having a sharp-edged apex formed by twisting the wire in an area between two adjoining corrugations to permit of accordion-like folding of said V-shaped means under normally applied loads when in use.

15. A wire spring unit for use in cushions and the like comprising a continuously horizontally corrugated wire twisted in definite local areas between two adjoining corrugations to provide a substantially flat seating area and a V-shaped accordion-like supporting portion with a sharp-edged apex.

16. A wire spring unit for use in cushions and the like comprising a horizontally corrugated wire bent in an extended area to provide a slightly downwardly curved seating area and twisted in local areas to provide at one end of said seating area an accordion fold portion of V-shaped form with a sharp-edged apex, the angle between said seating area and the said accordion fold portion and the normal divergence of the elements of said accordion fold portion being changed when such a spring unit is assembled in a cushion.

17. A wire spring unit for use in cushions and the like comprising a continuously corrugated wire having substantially straight portions between oppositely extended loops forming the corrugations of said wire and rebent by twisting in some of said straight portions to provide an accordion fold portion with a sharp-edged apex at one end of a substantially flat seating portion, said wire corrugated in such fashion that in the areas therein between said accordion fold portions, the major portion of the flexure of said wire during any substantial change in the divergence of said accordion fold portions occurs as torsion in said substantially straight portions.

MORRIS FREUND.